United States Patent
Kang

(10) Patent No.: US 12,052,480 B2
(45) Date of Patent: Jul. 30, 2024

(54) METHOD AND APPARATUS FOR ASSISTING WATCHING VIDEO CONTENT

(71) Applicant: LINE Plus Corporation, Seongnam-si (KR)

(72) Inventor: Eun Bin Kang, Seongnam-si (KR)

(73) Assignee: LINE Plus Corporation, Gyeonggi-do (KR)

( * ) Notice: Subject to any disclaimer, the term of this patent is extended or adjusted under 35 U.S.C. 154(b) by 168 days.

(21) Appl. No.: 17/879,961

(22) Filed: Aug. 3, 2022

(65) Prior Publication Data

US 2023/0044057 A1    Feb. 9, 2023

(30) Foreign Application Priority Data

Aug. 9, 2021  (KR) .......................... 10-2021-0104552

(51) Int. Cl.
*H04N 21/8405*  (2011.01)
*H04N 21/858*  (2011.01)

(52) U.S. Cl.
CPC ....... *H04N 21/8405* (2013.01); *H04N 21/858* (2013.01)

(58) Field of Classification Search
CPC .......................... H04N 21/8405; H04N 21/858
See application file for complete search history.

(56) References Cited

U.S. PATENT DOCUMENTS

| | | | |
|---|---|---|---|
| 10,341,744 B2 * | 7/2019 | Gupta | H04N 21/266 |
| 11,558,672 B1 * | 1/2023 | Clasen | H04N 21/4122 |
| 2014/0068692 A1 * | 3/2014 | Archibong | H04N 21/6334 |
| | | | 725/116 |
| 2015/0382047 A1 * | 12/2015 | Van Os | H04N 21/2541 |
| | | | 725/38 |
| 2018/0152767 A1 * | 5/2018 | Liu | H04N 21/4781 |
| 2021/0127178 A1 * | 4/2021 | Zhang | G06Q 30/0251 |
| 2021/0240756 A1 * | 8/2021 | Taboriskiy | G06F 16/48 |

* cited by examiner

*Primary Examiner* — Nicholas T Corbo

(74) *Attorney, Agent, or Firm* — Harness, Dickey & Pierce, P.L.C.

(57) ABSTRACT

Provided is a method for assisting video content viewing, the method being performed by processing circuitry of a user terminal, and the method including displaying a playback screen of first video content on a display of the user terminal, the first video content being played on the playback screen, generating a graphic object configured to enable playback of similar content associated with a first playback time of the first video content, and displaying the graphic object on the display together with the playback screen of the first video content.

17 Claims, 10 Drawing Sheets

METHOD AND APPARATUS FOR ASSISTING WATCHING VIDEO CONTENT

CROSS-REFERENCE TO RELATED APPLICATION

This application claims priority to Korean Patent Application No. 10-2021-0104552, filed in the Korean Intellectual Property Office on Aug. 9, 2021, the entire contents of which are hereby incorporated by reference.

TECHNICAL FIELD

The present disclosure relates to a method and an apparatus for assisting watching video content, and more particularly, to a method and an apparatus for recommending similar content associated with a specific playback time in video content while playing the video content.

BACKGROUND

Most smartphone users are very active in watching video content, with surveys suggesting that they use video services every day. Further, information retrieval, which was previously done through portal sites, is now done through videos. However, there are many inconveniences in watching video contents according to the related art.

In the case of text content, it is easy to find the preferred or desired part by browsing the text and directly viewing that part, but in the case of video content, it is difficult to browse through the content to locate a preferred or desired portion (e.g., scene), and thus, excessive time is spent watching undesired portions (e.g., scenes). In addition, in the case of real-time live broadcasting, a user communicates interactively with other users who watch the same video content together, whereas in the case of watching general video content that is non-live broadcasting, there is a challenge in that the user is unable to communicate with other users or share reviews. In addition, when reading the comments associated with a specific portion (e.g., scene) of video content, there is a problem in that the user alternates between watching the video content and reading the comments, or goes back to the playback time associated with the comment to replay from there and watch.

SUMMARY

In order to address the challenges described above, the present disclosure provides a method for, a non-transitory computer-readable recording medium storing instructions for, and an apparatus (system) for assisting watching video content.

The present disclosure may be implemented in a variety of ways, including a method, an apparatus (system), or a non-transitory computer-readable storage medium storing instructions.

According to embodiments, a method for assisting video content viewing is provided, the method being performed by processing circuitry of a user terminal, and the method including displaying a playback screen of first video content on a display of the user terminal, the first video content being played on the playback screen, generating a graphic object configured to enable playback of similar content associated with a first playback time of the first video content, and displaying the graphic object on the display together with the playback screen of the first video content.

According to embodiments, the method may further include extracting a keyword based on information associated with the first video content, determining at least one comparison criterion based on the keyword, and determining the similar content based on the at least one comparison criterion.

According to embodiments, the information associated with the first video content may include at least one of a title of the first video content, a description of the first video content, or a hashtag corresponding to the first video content.

According to embodiments, the similar content may be a second playback time in the first video content or a third playback time in a second video content.

According to embodiments, the at least one comparison criterion may include at least one of an image feature, a sound feature, or a text feature.

According to embodiments, the determining the at least one comparison criterion may include determining the at least one comparison criterion to include an image feature and a text feature in response to determining that the keyword is associated with a visual theme.

According to embodiments, the determining the at least one comparison criterion may include determining the at least one comparison criterion to include a sound feature and a text feature in response to determining that the keyword is associated with an auditory theme.

According to embodiments, the displaying the graphic object may include displaying the graphic object in response to receiving a positive feedback input, the first playback time in the first video content being associated with a point at which the positive feedback input is received.

According to embodiments, the first playback time in the first video content may have a similarity to preference information, the similarity being equal to or greater than a first threshold, and the preference information may include at least one of a preferred image feature, a preferred sound feature, or a preferred text feature.

According to embodiments, the method may further include determining the preference information based on a plurality of playback times in a plurality of videos at which a respective positive feedback input is received, each of the plurality of playback times being associated with a respective image feature, a respective sound feature, and a respective text feature.

According to embodiments, the method may further include displaying a chatbot message on the display together with the playback screen of the first video content while playing the first video content, the chatbot message being associated with a second playback time in the first video content.

According to embodiments, the method may further include generating the chatbot message using a chatbot model, the chatbot model being trained based on a plurality of comments in a plurality of videos, and at least one of a respective image feature, a respective sound feature, or a respective text feature associated with each of the plurality of comments.

According to embodiments, the chatbot model may be trained by applying a weight based on a respective number of positive feedback inputs associated with each of the plurality of comments.

According to embodiments, the method may further include determining the chatbot message based on at least one of a first image feature, a first sound feature, or a first text feature of the second playback time in the first video content.

According to embodiments, the second playback time in the first video content may be associated with a point at which an utterance is input into a chat window, and the method may further include determining the chatbot message based on at least one of a first image feature, a first sound feature, or a first text feature of the second playback time in the first video content, and the utterance.

According to embodiments, the method may further include displaying a popular comment on the display together with the playback screen of the first video content while playing the first video content, the popular comment being associated with a third playback time in the first video content.

According to embodiments, the popular comment may be a comment that received a highest amount of positive feedback among a plurality of comments that include a timestamp of the third playback time.

According to embodiments, the popular comment may have a number of inputs indicating positive feedback equal to or greater than a second threshold.

According to embodiments, there may be provided a non-transitory computer-readable recording medium storing instructions that, when executed by one or more processors, cause the one or more processors to perform the method.

According to embodiments, a user terminal is provided, which may include a display, communication unit, and processing circuitry configured to display a playback screen of first video content on the display, the first video content being played on the playback screen, generating a graphic object configured to enable playback of similar content associated with a first playback time of the first video content, and displaying the graphic object on the display together with the playback screen of the first video content.

According to embodiments, it is possible to allow the user to efficiently watch video content that meets his or her preference, by recommending a playback time that the user may like based on the positive feedback information or preference frame information of the user.

According to embodiments, the user may have an effect of watching a real-time broadcasting, such as having a conversation while watching the video content together with another user, without watching the live broadcasting.

According to embodiments, user may concurrently watch the specific playback time in the video content and the associated comments thereof, without alternating between watching the video content and reading the comments, or replaying the playback time associated with the comment, thus may enjoy content watching and have improved user convenience.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will become more apparent to those of ordinary skill in the art by describing in detail embodiments thereof with reference to the accompanying drawings, in which.

DETAILED DESCRIPTION

Figure 1:
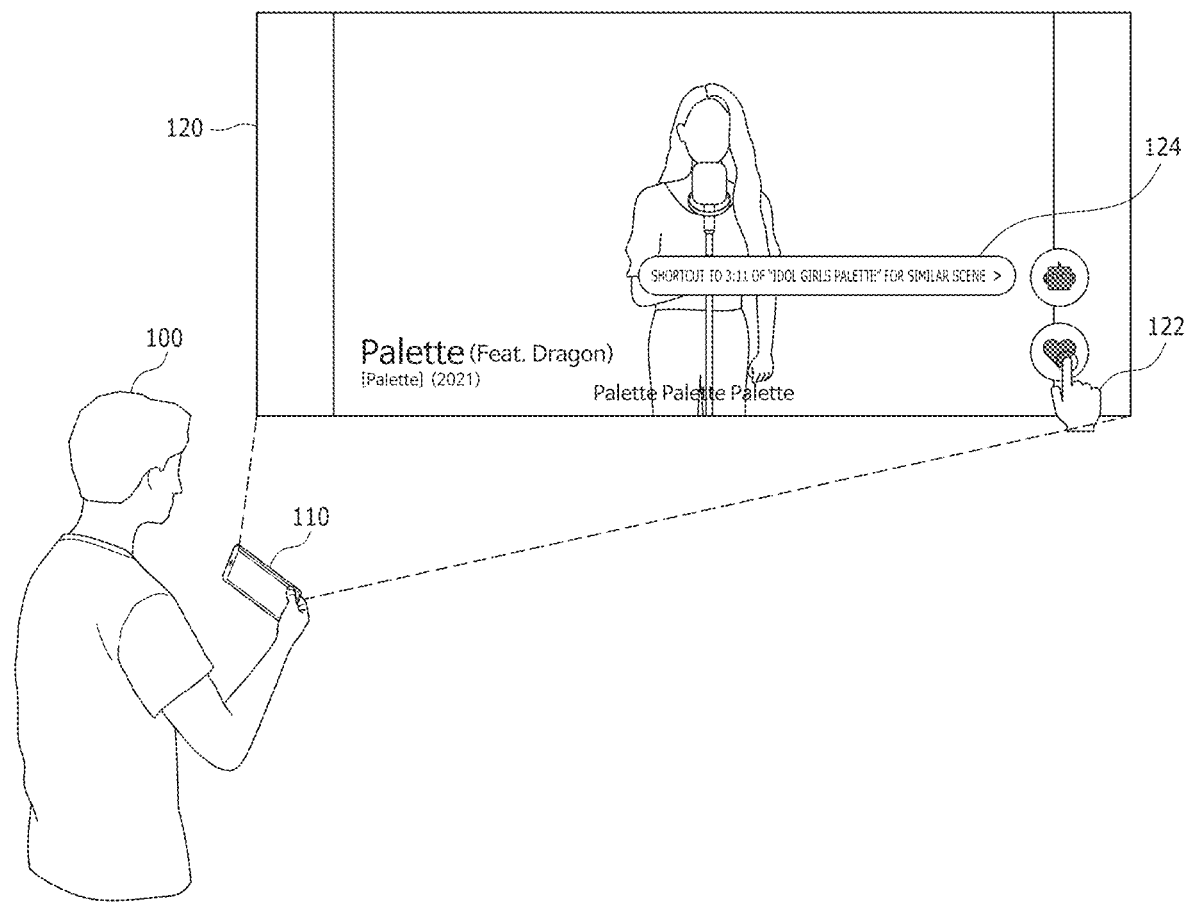
FIG. 1 is a diagram illustrating an example of recommending similar content according to embodiments of the present disclosure.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same, similar or corresponding components are assigned the same reference numerals. In addition, in the following description of embodiments, duplicate descriptions of the same or corresponding components may be omitted. However, even if descriptions of components are omitted, it is not intended that such components are not included in embodiments.

Advantages and features of embodiments and methods of accomplishing the same will be apparent by referring to examples described below in connection with the accompanying drawings. However, the present disclosure is not limited to the examples disclosed below, and may be implemented in various forms different from each other, and the present examples are merely provided to make the present disclosure complete, and to fully disclose the scope of the disclosure to those skilled in the art to which the present disclosure pertains.

The terms used herein will be briefly described prior to describing embodiments in detail. The terms used herein have been selected as general terms which are widely used at present in consideration of the functions of the present disclosure, and this may be altered according to the intent of an operator skilled in the art, conventional practice, or introduction of new technology. In addition, in specific cases, certain terms may be arbitrarily selected by the applicant, and the meaning of the terms will be described in detail in a corresponding description of embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and/or variables. Furthermore, functions provided in the components and the "modules" or "units" may be combined into a smaller number of components and "modules" or "units", or further divided into additional components and "modules" or "units."

According to embodiments, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor may read information from and/or write information to the memory. The memory integrated with the processor is in electronic communication with the processor.

In the present disclosure, "system" may refer to at least one of a server device and/or a cloud device, but not limited thereto. For example, the system may include one or more server devices. In another example, the system may include one or more cloud devices. In still another example, the system may include both the server device and the cloud device operated in conjunction with each other.

In the present disclosure, the "machine learning model" may include any model that is used for inferring an answer to a given input. According to embodiments, the machine learning model may include an artificial neural network model including an input layer, a plurality of hidden layers, and an output layer. Each layer may include a plurality of nodes. The present disclosure describes a plurality of machine learning models as separate machine learning models, but is not limited thereto, and some or all of the plurality of machine learning models may be implemented as one machine learning model. In addition, one machine learning model may include a plurality of machine learning models. In the present disclosure, the machine learning model may refer to an artificial neural network model, and the artificial neural network model may refer to the machine learning model.

In the present disclosure, "each of a plurality of A" may refer to each of all components included in the plurality of A, or may refer to each of some of the components included in a plurality of A.

In the present disclosure, a "playback time" may refer to a specific point of playback in video content. In addition, the playback time may include image information associated with a specific playback point in video content (e.g., an image at a specific point of playback or in a time section that includes the specific point of playback), text information (e.g., text extracted from subtitles or images that are included in the specific point of playback or in the time section that includes the specific point of playback, and the like), sound information (e.g., sound that is included in the specific point of playback or in the time section that includes the specific point of playback, and the like). In embodiments, the "playback time" may be referred to as a "frame".

In the present disclosure, "similar content" may include another playback time in a currently playing video content or a specific playback time in another video content.

In the present disclosure, "information associated with video content" may include information added by a user of a video content playback service or an information processing system to explain the content of the video contents, such as a title of the video content, description, hashtag, and the like, or to assist video content search.

In the present disclosure, a "keyword" may include one or more words. In embodiments, the keyword may be in a sentence form.

FIG. 1 is a diagram illustrating an example of recommending similar content according to embodiments. As illustrated, a user terminal 110 may display on a screen on a display that plays a video content 120. In embodiments, a user 100 may input positive feedback at a specific playback time while the video content 120 is being played. For example, while the video content 120 is being played, a "like" button 122 through which the user may input positive feedback may be displayed on the display of the user terminal 110 together with the video content 120. The user 100 may input positive feedback by touching or clicking the "like" button 122 at the specific playback time in the video content 120.

In embodiments, the user terminal 110 may recommend similar content by displaying on the display of the user terminal 110 a graphic object 124, that may play (e.g., may be used to play) the similar content, together with the video content 120. For example, in response to the user 100 inputting the "like" button 122 of the currently playing video content 120, the user terminal 110 may display on the display of the user terminal 110 the graphic object 124 that may play, starting from 3:11, the "IDOL GIRLS Palette" video that is determined to be the similar content (or, similar playback time) to the corresponding playback time. In embodiments, the graphic object 124 may include information and/or a preview image for the similar content.

Recommendation of similar content may be performed based on information associated with the positive feedback of the user 100. According to embodiments, recommendation of similar content may be performed based on a playback time associated with a point within the playing video content 120 at which the user 100 inputted positive feedback. For example, when the user 100 inputs positive feedback by touching the "like" button 122 while playing the video content 120, it is possible to recognize a playback time associated with the point at which the user 100 inputted positive feedback, and recommend similar content associated with the corresponding playback time to the user 100. In embodiments, the similar content may be another playback time in the currently playing video content 120 or a specific playback time in other video content (e.g., another video).

Additionally or alternatively, recommendation of similar content may be performed based on preference information of the user 100. For example, the preference information of the user may be determined based on a plurality of playback times in the plurality of video content at which the user 100 inputted positive feedback, and a specific playback time in the video content 120 similar to the preference information of the user may be recommended. Additionally or alternatively, when the specific playback time in the video content 120 similar to the preference information of the user is played, similar content associated with the corresponding playback time may be automatically recommended to the user 100.

The user terminal 110 may play the similar content in response to an input of the user 100 to the graphic object 124 that may play similar content. For example, in response to the user 100 touching the graphic object 124, the user terminal 110 may play the "IDOL GIRLS Palette" video, starting from 3:11. With such a configuration, it is possible to allow the user to efficiently watch the video content that meets his or her preference, by recommending a playback time that the user may like based on the positive feedback information or preference frame information of the user.

Figure 2:
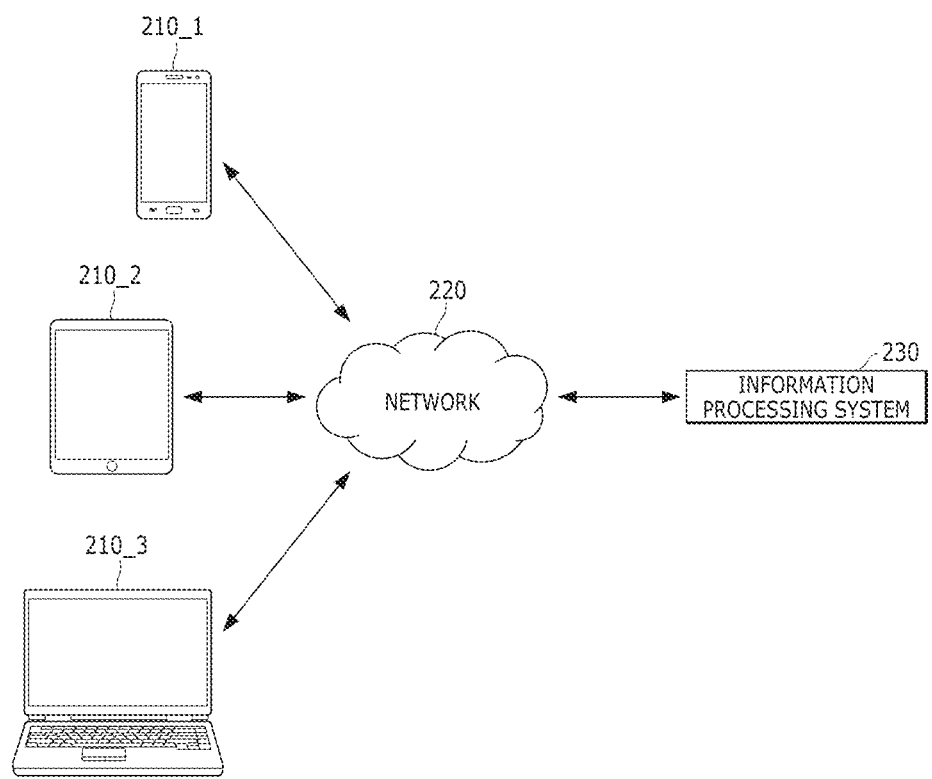
FIG. 2 is a schematic diagram illustrating a configuration in which an information processing system is communicatively connected to a plurality of user terminals according to embodiments.

FIG. 2 is a schematic diagram illustrating a configuration in which an information processing system 230 is communicatively connected to a plurality of user terminals 210_1, 210_2, and/or 210_3 according to embodiments. As illustrated, the plurality of user terminals 210_1, 210_2, and 210_3 may be connected to the information processing system 230 that is capable of providing a video content playback service through a network 220. In this case, the plurality of user terminals 210_1, 210_2, and 210_3 may include terminals of users who receive the video content playback service. In embodiments, the information processing system 230 may include one or more server devices and/or databases, or one or more distributed computing devices and/or distributed databases based on cloud computing services that may store, provide, and execute computer-executable programs (e.g., downloadable applications) and data relating to the provision of video content playback service and the like.

The video content playback service provided by the information processing system 230 may be provided to the user through the video content playback application, a web browser, or the like installed in each of the plurality of user terminals 210_1, 210_2, and 210_3. For example, the information processing system 230 may provide information or perform processes corresponding to a request for video content playback, a request for information associated with video content, a request for recommendation of similar content, or the like, received from the user terminals 210_1, 210_2, and 210_3 through a video content playback application, or the like.

The plurality of user terminals 210_1, 210_2, and 210_3 may communicate with the information processing system 230 through the network 220. The network 220 may be configured to enable communication between the plurality of user terminals 210_1, 210_2, and 210_3, and the information processing system 230. The network 220 may be configured as a wired network such as Ethernet, a wired home network (Power Line Communication), a telephone line communication device and recommended standard (RS)-serial communication, a wireless network such as a mobile communication network, a wireless local area network (LAN) (WLAN), Wi-Fi, Bluetooth, and/or ZigBee, or a combination thereof, depending on the installation environment. The method of communication may include a communication method using a communication network (e.g., mobile communication network, wired Internet, wireless Internet, broadcasting network, satellite network, and the like) that may be included in the network 220 as well as short-range wireless communication between the user terminals 210_1, 210_2, and 210_3, but embodiments are not limited thereto.

In FIG. 2, the mobile phone terminal 210_1, the tablet terminal 210_2, and the PC terminal 210_3 are illustrated as the examples of the user terminals, but embodiments are not limited thereto, and the user terminals 210_1, 210_2, and 210_3 may each be any computing device that is capable of wired and/or wireless communication and that has the video content playback application, the web browser, or the like installed therein and executed. For example, the user terminal may include an artificial intelligence (AI) speaker, a smart phone, a mobile phone, a navigation device, a computer, a notebook, a digital broadcasting terminal, a personal digital assistant (PDA), a portable multimedia player (PMP), a tablet PC, a game console, a wearable device, an internet of things (IoT) device, a virtual reality (VR) device, an augmented reality (AR) device, a set-top box, and so on. In addition, FIG. 2 illustrates that three user terminals 210_1, 210_2, and 210_3 are in communication with the information processing system 230 through the network 220, but embodiments are not limited thereto, and a different number of user terminals may be configured to be in communication with the information processing system 230 through the network 220.

According to embodiments, the information processing system 230 may receive a request for recommendation of similar content from the plurality of user terminals 210_1, 210_2 and 210_3. Then, the information processing system 230 may provide data related to the similar content to the plurality of user terminals 210_1, 210_2, and 210_3.

Figure 3:
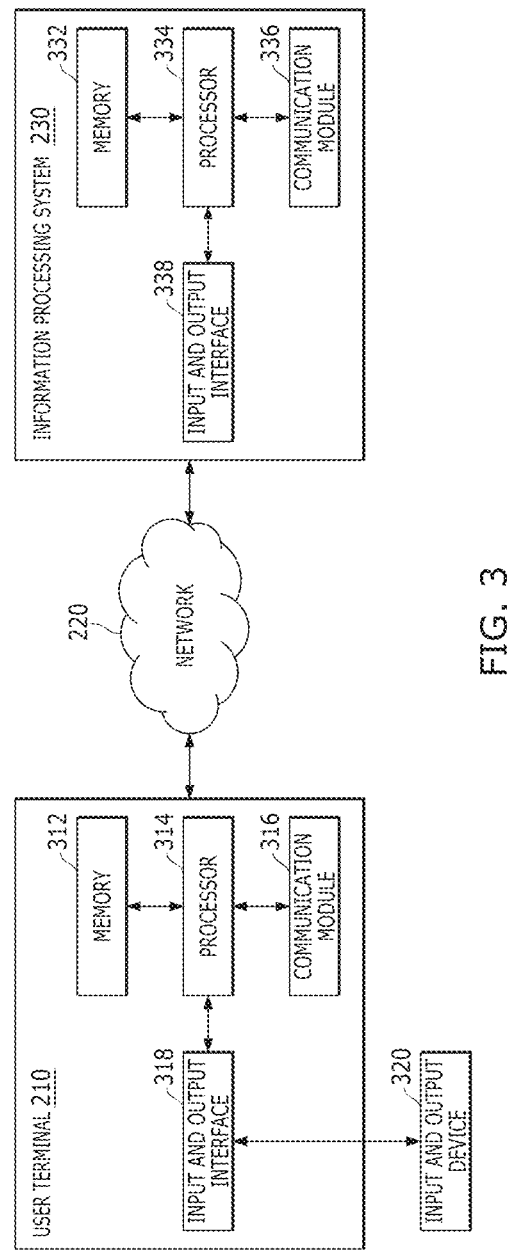
FIG. 3 is a block diagram illustrating an internal configuration of the user terminal and the information processing system according to embodiments.

FIG. 3 is a block diagram illustrating an internal configuration of the user terminal 210 and the information processing system 230 according to embodiments. The user terminal 210 may refer to any computing device that is capable of executing the video content playback application, a web browser, or the like and also capable of wired/wireless communication, and may include the mobile phone terminal 210_1, the tablet terminal 210_2, and the PC terminal 210_3 of FIG. 2, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using the respective communication modules 316 and 336.

In addition, an input and output device 320 may be configured to input information and/or data to the user terminal 210 or to output information and/or data generated from the user terminal 210 through the input and output interface 318.

The memories 312 and 332 may include any non-transitory computer-readable recording medium. According to embodiments, the memories 312 and 332 may include a permanent mass storage device such as random access memory (RAM), read only memory (ROM), a disk drive, a solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is separate from the memory. In addition, an operating system and at least one program code (e.g., a code for a video content playback application, and the like installed and driven in the user terminal 210) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules rather than the computer-readable recording medium. For example, at least one program may be loaded into the memories 312 and 332 based on a computer program installed by files provided by developers or a file distribution system that distributes an installation file of an application through the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., a request for recommendation of similar content, a request for generation of chatbot message, or data associated therewith, or the like) generated by the processor 314 of the user terminal 210 according to the program code stored in the recording device such as the memory 312 and the like may be sent to the information processing system 230 through the network 220 under the control of the communication module 316. Conversely, a control signal or a command provided under the control of the processor 334 of the information processing system 230 may be received by the user terminal 210 through the communication module 316 of the user terminal 210 from the communication module 336 and the network 220. For example, the user terminal 210 may receive data related to similar content or data related to a chatbot message from the information processing system 230 through the communication module 316.

The input and output interface 318 may be a means for interfacing with the input and output device 320. According to embodiments, the input and output device 320 may include an input device and/or an output device. As an example, the input device may include a device such as a camera including an audio sensor and/or an image sensor, a keyboard, a microphone, a mouse, and so on, and the output device may include a device such as a display, a speaker, a haptic feedback device, and so on. As another example, the input and output interface 318 may be a means for interfacing with a device such as a touch screen or the like that integrates a configuration or function for performing inputting and outputting. For example, when the processor 314 of the user terminal 210 processes the instructions of the computer program loaded in the memory 312, a service screen or the like, which is configured with the information and/or data provided by the information processing system 230 or another user terminal, may be displayed on the display through the input and output interface 318. While FIG. 3 illustrates that the input and output device 320 is not included in the user terminal 210, embodiments are not limited thereto, and an input and output device may be configured as one device with the user terminal 210. In addition, the input and output interface 338 of the information processing system 230 may be a means for interfacing with a device (not illustrated) for inputting or outputting that may be connected to, or included in the information processing system 230. In FIG. 3, while the input and output interfaces 318 and 338 are illustrated as the components configured separately from the processors 314 and 334, embodiments are not limited thereto, and the input and output interfaces 318 and 338 may be configured to be included in the processors 314 and 334.

The user terminal 210 and the information processing system 230 may include more than those components illustrated in FIG. 3. According to embodiments, the user terminal 210 may be implemented to include at least a part of the input and output device 320 described above. In addition, the user terminal 210 may further include other components such as a transceiver, a Global Positioning System (GPS) module, a camera, various sensors, a database, and the like. For example, when the user terminal 210 is a smartphone, it may include components generally included in the smartphone. For example, in an implementation, various components such as an acceleration sensor, a gyro sensor, a camera module, various physical buttons, buttons using a touch panel, input and output ports, a vibrator for vibration, and so on may be further included in the user terminal 210. According to embodiments, the processor 314 of the user terminal 210 may be configured to operate an application or the like that provides a video content playback service. In this case, a code associated with the application and/or program may be loaded into the memory 312 of the user terminal 210.

While the program for the application or the like that provides video content playback service is being operated, the processor 314 may receive text, an image, video, audio, and/or action, and so on inputted or selected through the input device such as a touch screen connected to the input and output interface 318, a keyboard, a camera including an audio sensor and/or an image sensor, a microphone, and so on, and store the received text, image, video, audio, and/or action, and so on in the memory 312, or provide the same to the information processing system 230 through the communication module 316 and the network 220. For example, the processor 314 may receive an input of positive feedback for a specific playback time in the video content or an input for a graphic object that can play similar content, and provide it to the information processing system 230 through the communication module 316 and the network 220. As another example, the processor 314 may receive an input of user utterance and provide it to the information processing system 230 through the communication module 316 and the network 220.

The processor 314 of the user terminal 210 may be configured to manage, process, and/or store the information and/or data received from the input device (e.g., the input and output device 320), another user terminal, the information processing system 230 and/or a plurality of external systems. The information and/or data processed by the processor 314 may be provided to the information processing system 230 through the communication module 316 and the network 220. The processor 314 of the user terminal 210 may send the information and/or data to the input and output device 320 through the input and output interface 318 to output the same. For example, the processor 314 may display the received information and/or data on a screen of the user terminal.

The processor 334 of the information processing system 230 may be configured to manage, process, and/or store information and/or data received from a plurality of user terminals 210 and/or a plurality of external systems. The information and/or data processed by the processor 334 may be provided to the user terminals 210 through the communication module 336 and the network 220. In embodiments, the processor 334 of the information processing system 230 may provide data related to the similar content to the user terminal 210 based on the information related to the request for recommendation of similar content received from the plurality of user terminals 210.

The processor 334 of the information processing system 230 may be configured to output the processed information and/or data through the output device (e.g., of the input and output device 320) such as a device (e.g. a touch screen, a display, and so on) capable of outputting a display of the user terminal 210 or a device (e.g., a speaker) capable of outputting an audio. For example, the processor 334 of the information processing system 230 may be configured to provide data related to the similar content to the user terminal 210 through the communication module 336 and the network 220 and output the similar content (and/or information related to the similar content) through the device capable of outputting a display, the device capable of outputting an audio, or the like of the user terminal 210. As another example, the processor 334 of the information processing system 230 may be configured to provide data and the like related to the chatbot message to the user terminal 210 through the communication module 336 and the network 220, and output through the device capable of outputting a display or the like of the user terminal 210.

Figure 4:
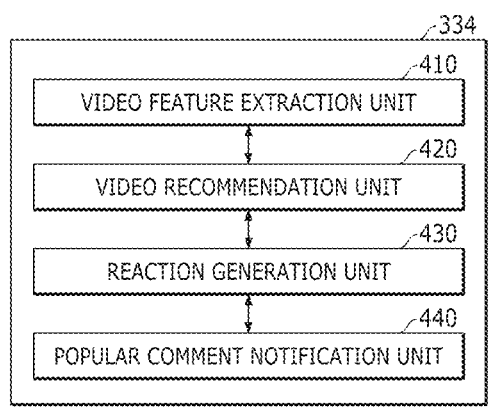
FIG. 4 is a block diagram of an internal configuration of a processor according to embodiments of the present disclosure.

FIG. 4 is a block diagram illustrating an internal configuration of the processor 334 according to embodiments. As illustrated, the processor 334 may include a video feature extraction unit 410, a video recommendation unit 420, a reaction generation unit 430, and/or a popular comment notification unit 440. While only one processor is illustrated in FIG. 4, embodiments are not limited thereto, and there may be a plurality of processors.

The video feature extraction unit 410 may extract a plurality of frames from a plurality of videos. For example, the video feature extraction unit 410 may extract a plurality of frames by dividing a plurality of videos into (e.g., by) a predetermined or alternatively, given time unit (e.g., 10 times per second or $\frac{1}{10}^{th}$ of a second). Then, frame features may be extracted from the plurality of frames. For example, the video feature extraction unit 410 may extract image features, sound features, and/or text features from each frame. The image feature may include information on an object included in the frame (e.g., people, animals, things, landscapes, and the like), the sound feature may include information on a human voice, animal sound, noise, background music, and the like included in the playback section associated with the frame, and the text feature may include information on text (e.g., text in a signboard, logo, and the like), subtitles, and the like extracted from the image of the frame. The plurality of frames extracted by the video feature extraction unit 410 and/or the data associated with the features of the plurality of frames may be used for the recommendation of similar content, generation of a chatbot message, and/or notification of a popular comment (and/or learning for the same), and may be stored in a storage unit such as a memory or the like.

The video recommendation unit 420 may determine and recommend similar content associated with the specific playback time in the video content. The similar content may include another playback time within the playing video content or a specific playback time in other video content (e.g., another video). According to embodiments, the video recommendation unit 420 may extract a keyword from the information associated with the video content (e.g., a title, description, hashtag, and the like of the video content), and determine a comparison criterion (e.g., at least one of the image feature, the sound feature, and/or the text feature) from the extracted keyword. In addition, the video recommendation unit 420 may determine similar content associated with the specific playback time in the video content according to the determined comparison criterion. A process of the video recommendation unit 420 for determining similar content will be described in detail below with reference to FIG. 5.

The reaction generation unit 430 may generate a chatbot message associated with the specific playback time in the video content while the video content is being played. In embodiments, the reaction generation unit 430 may generate the chatbot message by inputting a specific playback time (or a specific frame) in the playing video content into the chatbot model.

According to embodiments, the chatbot model may be trained based on a plurality of comments in a plurality of video contents (e.g., a plurality of videos). Additionally or alternatively, the chatbot model may be trained by applying a weight to each of a plurality of comments based on the number of positive feedbacks (e.g., the number of positive feedback inputs received with respect to each comment). In other words, it is possible to train the chatbot model by giving higher weight to more popular comments. In embodiments, the plurality of comments used for training the chatbot model may include comments associated with a specific playback time in the video content. For example, comments including a timestamp for the specific playback time in the video content, comments posted by the user while watching a real-time live broadcast, comments posted while the specific playback time in the video content is being played, or comments posted while the video content is paused at the specific playback time, and the like may be associated with the specific playback time in the video content. With a plurality of comments associated with the specific playback time in the video content, the chatbot model may learn various correlations, such as the correlation between the content of the comments and the frame (or frame feature), the correlation between the plurality of comments over time, and the like. Additionally or alternatively, the chatbot model may be trained based on training data including a plurality of playback times (or frames) and comment pairs generated by human or another model. For example, according to embodiments, the chatbot model may be trained by inputting each of (e.g., successively) the plurality of playback times (or frames) into the chatbot model to obtain a candidate comment. The candidate comment may be compared to a respective comment (or comment pair) of the training data (also referred to below as a "training comment") corresponding to the playback time (or frame) on which the candidate comment is based. The chatbot model may be adjusted (e.g., iteratively) according to the comparison. For example, each training comment (or comment pair) may include the correct (or a highly accurate) comment and/or the incorrect (or a highly inaccurate) comment for the corresponding playback time (or frame). The comparison of the candidate comment to the training comment may provide a result indicative of whether the candidate and training comments match and/or a distance between the candidate and training comments. This result of the comparison may be used to adjust the chatbot model to output a more accurate candidate comment. The training of the chatbot model may be performed until the accuracy of the chatbot model reaches a desired level.

The chatbot model may generate chatbot messages from the input specific playback times (or specific frames). In this case, the specific playback time may be any playback time in the playing video content or a playback time at which the user inputs positive feedback. According to embodiments, the chatbot model may extract frame features from the input specific playback time (or specific frame). For example, at least one of the image feature, the sound feature, or the text feature may be extracted from the specific playback time to generate a chatbot message based on the extracted feature. Alternatively, the chatbot model may receive the feature of the specific playback time (or the specific frame) extracted from the video feature extraction unit 410 and generate a chatbot message based on the received feature.

Additionally or alternatively, the chatbot model may generate chatbot messages responsive to user utterance from the specific playback time and user utterance. In this case, the specific playback time may be associated with the point at which the user inputted the user utterance into the chat window. That is, a chatbot message in response to the user utterance may be generated based on the content of the user utterance and the frame feature (e.g., the image feature, the sound feature, the text feature, and the like) associated with the point at which the user inputted the user utterance into the chat window. With such a configuration, the user may have an effect of watching a real-time broadcast, such as having a conversation while watching the video content together with another user, without watching the live broadcast.

The popular comment notification unit 440 may extract popular comments associated with the specific playback time in the video content while the video content is being played. According to embodiments, a popular comment associated with the specific playback time may be a comment that received the most positive feedback among the comments including the timestamp for the specific playback time. Additionally or alternatively, the popular comment may be a comment having positive feedback (e.g., a number of times positive feedback was input) equal to or greater than a predetermined or alternatively, given threshold. For example, the popular comment may be a comment with 10 or more "likes".

According to embodiments, the popular comment notification unit 440 may extract a comment without the timestamp for the specific playback time as the popular comment associated with the specific playback time. For example, the popular comment notification unit 440 may be trained in a manner similar to the chatbot model described above. That is, the popular comment notification unit 440 may learn the correlation between the content of the comment and the frame (or frame feature). Then, by extracting the feature from the specific playback time (or frame) in the video content, or by receiving the feature from the video feature extraction unit 410, the popular comment notification unit 440 may determine the similarity between the specific playback time (or frame) and the popular comment, and extract the popular comments having similarity equal to or greater than a predetermined or alternatively, given threshold.

The popular comments extracted by the popular comment notification unit 440 may be displayed on the display of the user terminal together with the video content playback screen. For example, when the user terminal plays a section associated with the specific playback time in the video content, the popular comments associated with the specific playback time may be displayed on the display. In this case, in order to prevent the display of the popular comments from interfering with watching video content (or reduce an amount of the interference), the number of popular comments for display may be limited. For example, a maximum (or upper limit) of one popular comment may be displayed for every 3 seconds of play time. With such a configuration, the user may concurrently watch the specific playback time in the video content and the associated comments thereof, without alternate between watching the video content and reading the comments, or replaying the playback time associated with the comment, and thus may enjoy content watching and have improved user convenience.

According to embodiments, the video feature extraction unit 410, the video recommendation unit 420, the reaction generation unit 430, and the popular comment notification unit 440 described above may be implemented as one or more machine learning models.

Although the internal components of the processor 334 have been described separately for each function in FIG. 4, this does not necessarily mean that they are physically separated. In addition, the internal configuration of the processor 334 illustrated in FIG. 4 is merely an example, and may be implemented differently in embodiments. For example, the processor 334 may further include components other than the illustrated internal components, and some components may be omitted. In embodiments, one or more components of the video feature extraction unit 410, the video recommendation unit 420, the reaction generation unit 430, and/or the popular comment notification unit 440 may be included in the processor of the user terminal, and one or more of the operations performed by the internal configuration may be performed by the processor of the user terminal.

Figure 5:
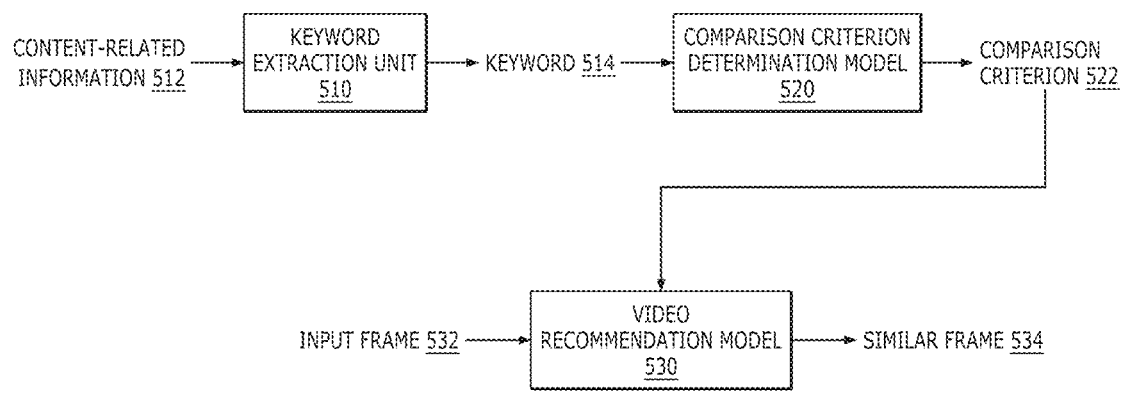
FIG. 5 is a diagram illustrating an example of determining similar content according to embodiments.

FIG. 5 is a diagram illustrating an example of a process of determining a similar frame 534 according to embodiments. According to embodiments, the similar frame 534 may be determined by using a keyword extraction unit 510, a comparison criterion determination model 520, and/or a video recommendation model 530 included in at least one processor of the user terminal or in at least one processor of the information processing system. The keyword extraction unit 510 may extract a keyword 514 from information 512 associated with the video content. In embodiments, the information 512 associated with the video content may include information added by a user of a video content playback service or an information processing system to explain the content of the video content, such as the title of the video content, description, hashtag, and the like, or to assist a video content search.

In embodiments, the keyword extraction unit 510 may extract, as the keyword 514, only a portion suitable for determining a comparison criterion 522. Additionally or alternatively, the keyword extraction unit 510 may extract only a meaningful part as the keyword 514 from the information 512 associated with the video content, while excluding postpositions, adverbs, symbols, emoticons, and the like. For example, when the title of the video content is "[4K] Watch Live: Killing Voice of IDOL GIRLS/One Day", the keyword extraction unit 510 may extract "Watch Live", "Killing Voice", "IDOL GIRLS", and "One Day" as the keywords 514 from the title of the video content, while excluding the "[4K]", ":", "of" and "/" parts.

The comparison criterion determination model 520 may determine the comparison criterion 522 from the extracted keyword(s) 514, and the determined comparison criterion 522 may be a criterion for determining the similar frame 534. In this case, the comparison criterion 522 may include at least one of the image feature, the sound feature, or the text feature. In embodiments, when the keyword 514 is determined to be associated with a visual theme, the comparison criterion determination model 520 may determine the image feature and the text feature as the comparison criterion 522. For example, when the keyword 514 is "mukbang" or "doughnut", the comparison criterion determination model 520 may determine the image feature and the text feature as the comparison criterion 522. In embodiments, when the keyword 514 is determined to be associated with an auditory theme, the comparison criterion determination model 520 may determine the sound feature and the text feature as the comparison criterion 522. In embodiments, when the keyword 514 is determined to be associated with both the visual theme and the auditory theme, the comparison criterion determination model 520 may determine the image feature, the sound feature and the text feature as the comparison criterion 522. For example, when the keyword 514 is "IDOL", "Killing Voice", and they are determined to be associated with the auditory theme, the comparison criterion determination model 520 may determine the sound feature and the text feature as the comparison criterion 522. In embodiments, the comparison criterion determination model 520 may be generated based on training data including a plurality of keywords and comparison criterion pairs. For example, according to embodiments, the comparison criterion determination model 520 may be trained by inputting each of (e.g., successively) the plurality of keywords into the comparison criterion determination model 520 to obtain a candidate comparison criterion. The candidate comparison criterion may be compared to a respective comparison criterion (or comparison criterion pair) of the training data (also referred to below as a "training comparison criterion") corresponding to the keyword on which the candidate comparison criterion is based. The comparison criterion determination model 520 may be adjusted (e.g., iteratively) according to the comparison. For example, each training comparison criterion (or criterion pair) may be the correct (or a highly accurate) comparison criterion, and/or the incorrect (or a highly inaccurate) comparison criterion for the corresponding key word. Accordingly, the comparison of the candidate comparison criterion to the training comparison criterion may provide a result indicative of whether the candidate and training comparison criteria match and/or a distance between the candidate and training comparison criteria. This result of the comparison may be used to adjust the comparison criterion determination model 520 to output a more accurate candidate comparison criterion. The training of the comparison criterion determination model 520 may be performed until the accuracy of the comparison criterion determination model 520 reaches a desired level.

In embodiments, the comparison criterion determination model 520 may determine the comparison criterion 522 by determining weights of the image feature, the sound feature, and the text feature based on the keyword 514. For example, if the extracted keywords 514 are 'travel' and 'vlog', and it is determined that they are more related to a visual topic than an auditory topic, the comparison criterion determining model 520 may determine that the weight of the image feature is higher than the weight of the sound feature. In this case, the weight of the image feature may be set to 0.4, the weight of the sound feature may be set to 0.1, and the weight of the text feature may be set to 0.5 (default) since the keyword 514 is related to a visual subject. In another example, when the extracted keyword 514 is 'IDOL' and 'song cover', and it is determined that they are more related to an auditory subject than a visual subject, the comparison criterion determining model 520 may determine that the weight of the sound feature is higher than the weight of the image feature. In this case, the weight of the image feature may be set to 0.05, the weight of the sound feature 0.45, and the weight of the text feature may be set to 0.5 (default). In still another example, when the extracted keyword 514 is 'unboxing' and 'Popular brand', and it is determined that they are neutral in terms of visual/auditory topic, the comparison criterion determination model 520 may determine that the weight of the image feature and the weight of the sound feature are equal. In this case, the weight of the image feature may be set to 0.25, the weight of the sound feature may be set to 0.25, and the weight of the text feature may be set to 0.5 (default). In embodiments, the comparison criterion determination model 520 may be generated based on learning data including a plurality of keywords and detailed weight information for each keyword.

The video recommendation model 530 may determine, from an input frame 532, the similar frame 534 that has the features similar to the input frame. In embodiments, the input frame 532 may be data associated with the preference information of the user. For example, the input frame 532 may be data associated with user preference information determined based on a plurality of playback times in a plurality of video contents that received the positive feedbacks input from the user. The user preference information may include information on the preference frame features extracted by analyzing common features from all or part of a plurality of frames preferred by the user (e.g., as indicated by frames at which the user inputs positive feedback, such as a "like" indication). Additionally or alternatively, the input frame 532 may be a specific playback time (or a frame associated therewith) of the video content. For example, the input frame 532 may be a specific playback time (or a frame associated therewith) in the video content determined based on the user preference information. As another example, the input frame 532 may be a playback time (or a frame associated therewith) associated with a point within the video content at which the user inputted positive feedback.

The similar frame 534 determined by the video recommendation model 530 is a frame having similar features to the input frame determined based on the comparison criterion 522, and may be a different playback time within the video content played by the user or a specific playback time within other video content (e.g., another video). In embodiments, the "frame having similar features" may include a frame having a similarity to an input frame, in which the similarity is equal to or greater than a predetermined or alternatively, given threshold or greater. In embodiments, the similarity between the input frame and other frames may be calculated as a similarity score using a machine learning model. For example, the similarity score between the input frame and other frames may be expressed as a value between 0 and 1. In this case, similarity score 0 indicates a case where there is no similarity between the input frame and the other frame, and similarity score 1 indicates that the input frame and the other frame are identical.

According to embodiments, the video recommendation model 530 may determine the similar frame 534 according to the comparison criterion 522 determined by the comparison criterion determination model 520. For example, when the comparison criterion 522 is the image feature and the text feature, the video recommendation model 530 may determine, as the similar frame 534, a frame having the image feature and text feature similar to the input frame 532. The similar frame 534 determined as described above may be recommended to the user by the user terminal. For example, the user terminal may recommend the similar frame 534 to the user by displaying on the display a graphic object that may play (e.g., may be used to play) the similar frame 534, together with the video content playback screen.

In embodiments, the keyword extraction unit 510, the comparison criterion determination model 520, and the video recommendation model 530 may be implemented as one or more machine learning models (e.g., artificial neural network models).

Figure 6:
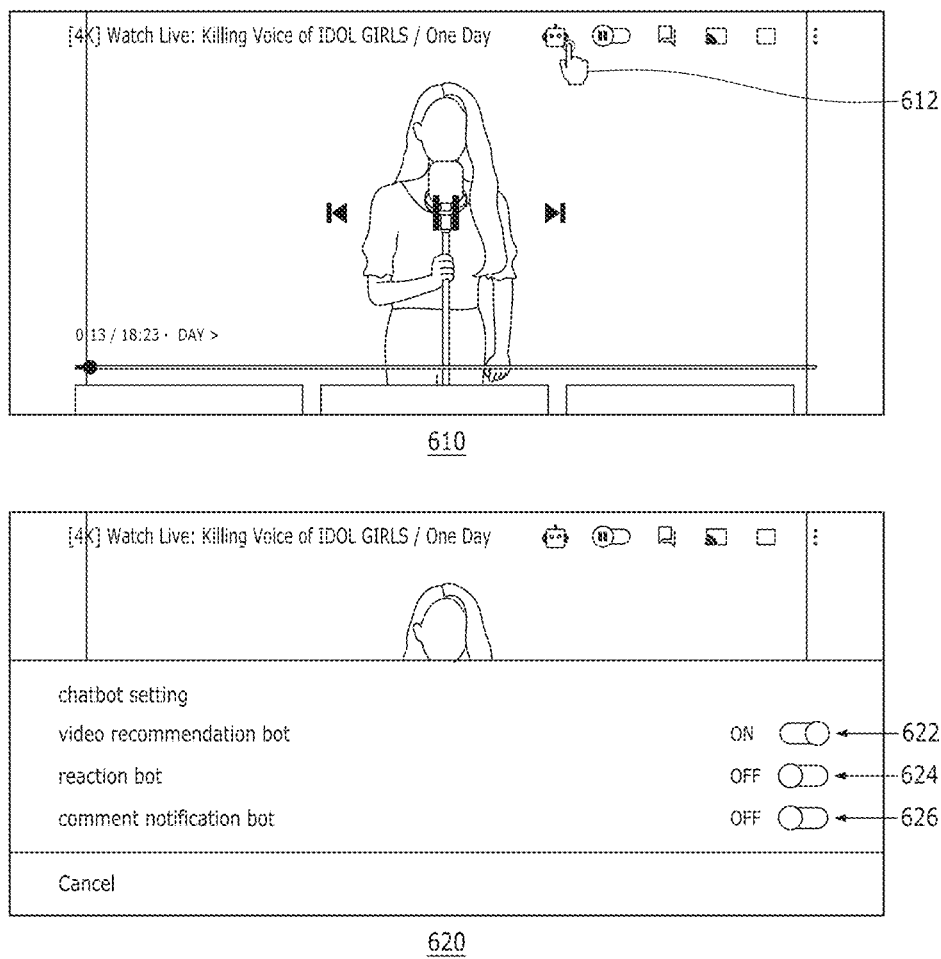
FIG. 6 is a diagram illustrating an example of setting whether or not to activate a function for assisting watching video content in a user terminal according to embodiments.

FIG. 6 is a diagram illustrating an example of setting whether or not to activate a function for assisting watching video content in the user terminal according to embodiments. The user may set whether or not to activate the function for assisting watching video contents, through a first operation 610 and a second operation 620. The first operation 610 represents an example in which the user enters a setting screen of the function for assisting watching video contents. The user terminal may display on the display a button for setting the function for assisting watching video contents, while the video content is being played. The user may touch or click 612 the button for setting the function for assisting watching video contents displayed on the display, to enter the setting screen of the function for assisting watching video contents.

The second operation 620 represents an example of setting whether or not to activate a detailed function for assisting watching video content. According to embodiments, toggle buttons 622, 624, and 626 for individually activating detailed functions may be displayed on the setting screen of the function for assisting watching video contents. The user may individually activate the detailed functions by touching, clicking, or dragging each of the toggle buttons 622, 624, or 626. For example, the setting screen illustrated in FIG. 6 illustrates an example in which only the video recommendation bot is activated while the reaction bot and the comment notification bot are deactivated. This may be a state in which the video recommendation unit of the processor is activated, and the reaction generation unit and popular comment notification unit are deactivated. The user may click, or drag the toggle button 624 on the right side of the reaction bot or the toggle button 626 on the right side of the comment notification bot to activate the reaction generation unit or the popular comment notification unit.

Figure 7:
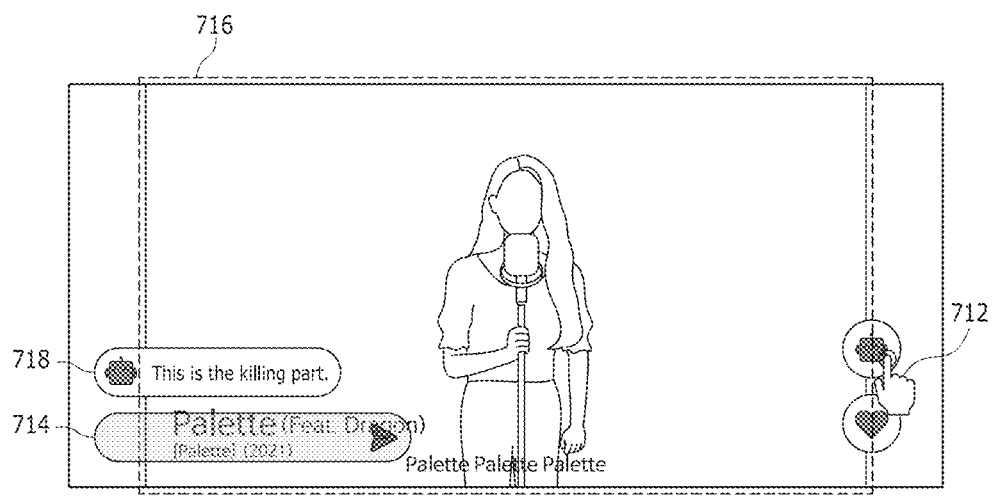
FIG. 7 is a diagram illustrating an example of displaying a chatbot message according to embodiments.

FIG. 7 is a diagram illustrating an example of displaying a chatbot message 718 according to embodiments. According to embodiments, with the reaction bot being activated, the user may touch or click 712 the reaction button to activate the chatting screen. When the reaction bot is activated, a reaction button may be displayed on top of (e.g., above, as illustrated) a built-in "like" button (e.g., a button for inputting positive feedback). In embodiments, the chat screen may include the chatbot message 718 generated by the reaction bot and a chat input field 714 for the user to communicate with the reaction bot.

In embodiments, the user terminal may display on the display the chatbot message 718 associated with a specific playback time (or specific frame) 716 in the playing video content. For example, the user terminal may display the chatbot message 718 "This is the killing part" associated with the frame 716 where the singer sings a song, together with the video content playback screen. The chatbot message 718 may be generated by the reaction generation unit.

In response to the chatbot message 718, or even without the chatbot message 718, the user may enter a chat in the chat input field 714, and touch or click a send button to register the user utterance. When there is the user utterance, the user terminal may display the chatbot message on the display in response to the user utterance. In this case, the chatbot message in response to the user utterance may be determined based on the user message and the playback time in the video content associated with the point at which user inputs the user utterance into the chat window (that is, based on the image feature, the sound feature, the text feature, and the like of the corresponding playback time).

With such a configuration, the user may have an effect of watching a real-time broadcast, such as having a conversation while watching video content together with another user, even when the video content is not a live broadcast.

Figure 8:
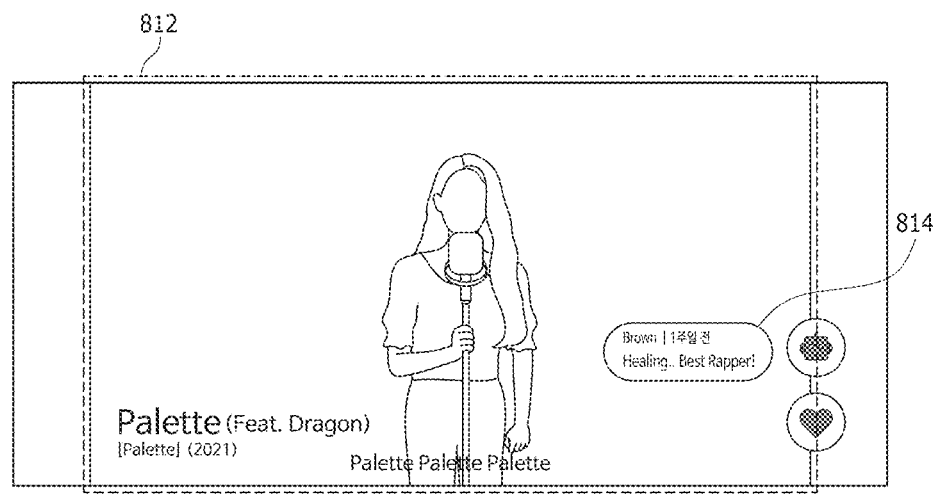
FIG. 8 is a diagram illustrating an example of displaying a popular comment notification according to embodiments.

FIG. 8 is a diagram illustrating an example of displaying a popular comment 814 according to embodiments. In embodiments, the user terminal may display on the display the popular comment 814 associated with a specific playback time (or specific frame) 812 in the playing video content. For example, as illustrated, the user terminal may display the popular comment "Healing . . . Best Rapper" 814 associated with the playback time 812 where the singer sings a song, together with the video content playback screen. In addition, the user terminal may also display an author of the popular comment, time of registration of the popular comment, number of positive feedbacks (number of received inputs indicating positive feedback) for the popular comment, and the like. The specific playback time 812 may be any playback time in the playing video content or a playback time at which the user inputted positive feedback.

According to embodiments, the popular comment 814 may be a comment that received the most positive feedback (e.g., largest number of inputs indicating positive feedback) among the comments including a timestamp of the specific playback time 812. For example, the popular comment "Healing . . . Best Rapper" 814 displayed on the video content playback screen may be a comment with the largest number of "likes" among the comments that include the playback time 812 where the singer sings a song as the timestamp. Additionally, in order to prevent the popular comments from being indiscreetly displayed and obstructing viewing of video content (or reduce the extent to which the popular comments are indiscreetly displayed and obstruct viewing of the video content), the popular comments may be limited to the comments that received positive feedbacks (e.g., largest number of inputs indicating positive feedback) equal to or greater than a predetermined or alternatively, given threshold, or the number of popular comments for display may be limited. For example, the popular comments may be limited to the comments with 10 or more "likes" and/or it may be limited to display a maximum (e.g., upper limit) of 1 comment per 3 seconds.

With such a configuration, the user may concurrently watch the specific playback time in the video content and the associated comments thereof, without alternating between watching the video content and reading the comments, or replaying the playback time associated with the comment, and thus may enjoy content watching and have improved user convenience.

Figure 9:
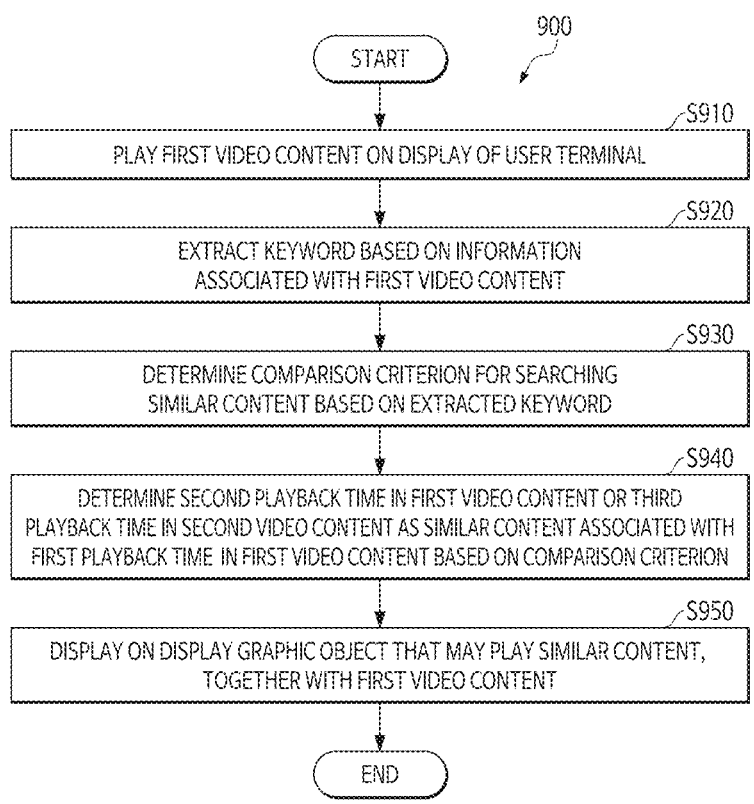
FIG. 9 is a flowchart illustrating a method for assisting watching video content according to embodiments.

FIG. 9 is a flowchart illustrating a method 900 for assisting watching video content according to embodiments. The method 900 may be performed by at least one processor of the user terminal. The method 900 may be initiated by the processor playing first video content on the display of the user terminal, at S910. Then, the processor may extract a keyword based on the information associated with the first video content, at S920. In this case, the information associated with the video content may include at least one of a title, a description, and/or a hashtag of the video content.

Then, the processor may determine at least one comparison criterion for searching similar content based on the extracted keyword, at S930. In this case, the comparison criterion may include at least one of the image feature, the sound feature, or the text feature. According to embodiments, the processor may determine a theme associated with the extracted keyword, and determine a comparison criterion accordingly. For example, when determining that the keyword is associated with the visual theme, the processor may determine the image feature and the text feature as the comparison criterion. As another example, when determining that the keyword is associated with the auditory theme, the processor may determine the sound feature and the text feature as the comparison criterion.

The processor may determine a similar content associated with the first playback time in the first video content based on the comparison criterion, at S940. For example, the processor may determine a second playback time in the first video content or a third playback time in second video content as the similar content. According to embodiments, the first playback time may be a playback time associated with a point at which the user inputted positive feedback. Additionally or alternatively, the first playback time in the first video content may be a playback time having a similarity to user preference information, in which the similarity is equal to or greater than a predetermined or alternatively, given threshold. That is, the first playback time may be a playback time having a feature that the user may like. In this case, the preference information of the user may include at least one of the image feature, the sound feature, or the text feature preferred by the user. In addition, the preference information of the user may be determined based on a plurality of playback times in a plurality of video content at which the user inputted positive feedback, and the plurality of playback times may include the image feature, the sound feature, and the text feature associated with the same, respectively.

Then, the processor may display on the display the graphic object that may play (e.g., may be used to play) the determined similar content, together with the playback screen of the first video content, at S950. For example, the similar content may be a second playback time in the first video content or a third playback time in the second video content. When the user selects the graphic object that may play similar content, the processor may play the similar content.

Figure 10:
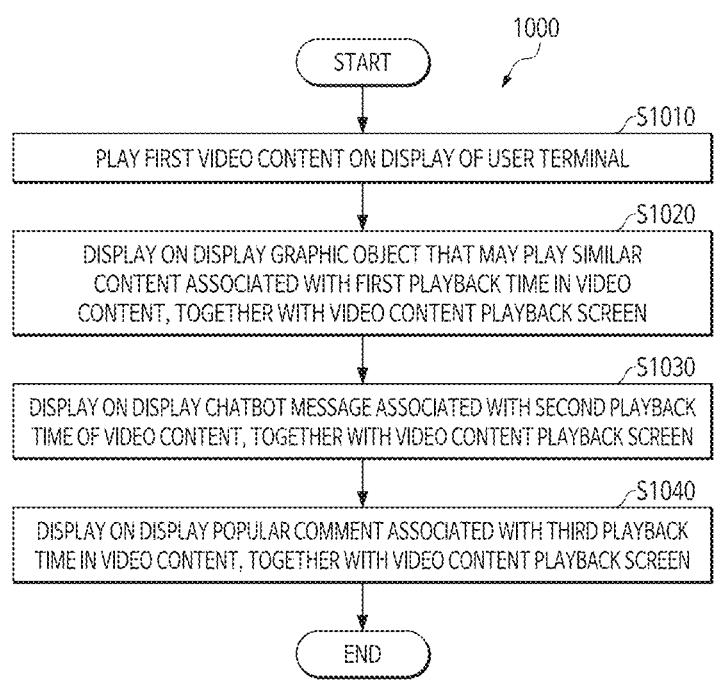
FIG. 10 is a flowchart illustrating a method for assisting watching video content according to embodiments.

FIG. 10 is a flowchart illustrating a method 1000 for assisting watching video content according to embodiments. The method 1000 may be performed by at least one processor of the user terminal. The method 1000 may be initiated by the processor playing the video content (e.g., the first video content) on the display of the user terminal, at S1010. Then, the processor may display on the display a graphic object that may play (e.g., may be used to play) a similar content associated with the first playback time in the video content, together with the video content playback screen, at S1020.

The processor may display on the display a chatbot message associated with the second playback time in the playing video content, together with the video content playback screen, at S1030. According to embodiments, the chatbot message may be generated by a chatbot model trained based on a plurality of comments in a plurality of video content, and on at least one of the image feature, the sound feature, or the text feature associated with each of the plurality of comments. In this case, the chatbot model may be trained by giving each of a plurality of comments a weight based on the number of positive feedbacks (e.g., based on the number of inputs indicating positive feedback).

According to embodiments, the chatbot message may be generated by inputting the second playback time into the chatbot model. In this case, the second playback time may be any playback time in the playing video content or a playback time associated with a point at which the user inputted positive feedback. In this case, the chatbot model may generate or determine the chatbot message based on at least one of the image feature, the sound feature, or the text feature of the input second playback time.

Additionally or alternatively, the chatbot message may be generated by inputting into the chatbot model the user utterance and a second playback time associated with the point at which the user inputted the user utterance into the chat window. In this case, the chatbot model may generate or determine the chatbot message based on at least one of the image feature, the sound feature, or the text feature of the input second playback time, and on the user utterance.

The processor may display on the display a popular comment associated with a third playback time in the video content, together with the video content playback screen, at S1040. According to embodiments, the third playback time may be any playback time in the playing video content or a playback time associated with a point at which the user inputted positive feedback. In addition, the popular comment may be a comment that received the most positive feedback (highest number of inputs indicating positive feedback) among the comments that include the timestamp of the third playback time. In embodiments, in order to prevent the popular comments from being indiscreetly displayed and obstructing viewing of video content (or reduce the extent to which the popular comments are indiscreetly displayed and obstruct viewing of the video content), the processor may limit the popular comments to the comments that have positive feedbacks (e.g., a number of inputs indicating positive feedback) equal to or greater than a predetermined or alternatively, given threshold (e.g., 10), or the number of popular comments for display may be limited (e.g., 1 per 3 seconds).

The flowcharts illustrated in FIGS. 9 and 10 and the above description are merely examples, and may be implemented differently in embodiments. For example, one or more operations may be omitted, the order of operations may be changed, one or more operations may be performed in parallel, or one or more operations may be repeatedly performed multiple times.

Conventional devices and methods for providing user interfaces for watching video content fail to assist a user with locating a preferred or desired portion of the video content. Instead, the conventional devices and methods merely provide user interfaces that enable the user to browse through the video content to locate the preferred or desired portion, thereby causing the user to view excessive undesired portions of the video content in order to locate the preferred or desired portion. Accordingly, the conventional devices and methods cause excessive delay and inefficiency in locating the preferred or desired portion of the video content resulting in a diminished user experience in viewing the video content.

However, according to embodiments, improved devices and methods are described for providing user interfaces for watching video content. For example, the improved devices and methods may provide a user interface that includes a graphic object enabling playback of content similar to the video content based on preferences of the user (e.g., inputs indicating positive feedback, preference information, etc.). Accordingly, through interaction with the graphic object, the user may video the preferred or desired portion of the video content without viewing excessive undesired portions of the video content. Thus, the improved devices and methods overcome the deficiencies of the conventional devices and methods to at least reduce delay and inefficiency in locating the preferred or desired portion of the video content, thereby improving the user's experience in viewing the video content.

The method described above may be provided as a computer program stored in a non-transitory computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, or a combination of hardware with firmware and/or software. Those skilled in the art will further appreciate that various illustrative logical blocks, modules, circuits, and algorithm steps described in connection with the disclosure herein may be implemented in electronic hardware, or a combination of hardware and computer software. To clearly illustrate this interchangeability of hardware, and hardware combined with software, various illustrative components, blocks, modules, circuits, and operations have been described above generally in terms of their functionality. Whether such a function is implemented as hardware, or hardware combined with software varies according to design implementations imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using hardware combined with firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, a compact disc (CD), magnetic or optical data storage devices, and the like. The instructions may be executable by one or more processors, and may cause the processor(s) to perform certain aspects of the functions described in the present disclosure.

According to embodiments, operations described herein as being performed by the user terminal 110, the information processing system 230, the user terminals 210_1, 210_2, and/or 210_3, the processor 314, the communication module 316, the input and output interface 318, the processor 334, the communication module 336, the input and output interface 338, the input and output device 320, the video feature extraction unit 410, the video recommendation unit 420, the reaction generation unit 430, the popular comment notification unit 440, the chatbot model, the comparison criterion determination model 520 and/or the video recommendation model 530 may be performed using, for example, hardware including logic circuits; a hardware/software combination such as at least one processor executing software; or a combination thereof. For example, such hardware may include, but is not limited to, a CPU, an arithmetic logic unit (ALU), a digital signal processor, a microcomputer, FPGA, a System-on-Chip (SoC), a programmable logic unit, a microprocessor, ASIC, etc., or any combination thereof.

According to embodiments, the processing circuitry may perform some operations (e.g., the operations described herein as being performed by the video feature extraction unit 410, the video recommendation unit 420, the reaction generation unit 430, the popular comment notification unit 440, the chatbot model, the comparison criterion determination model 520 and/or the video recommendation model 530) by artificial intelligence and/or machine learning. As an example, the processing circuitry may implement an artificial neural network (e.g., the video feature extraction unit 410, the video recommendation unit 420, the reaction generation unit 430, the popular comment notification unit 440, the chatbot model, the comparison criterion determination model 520 and/or the video recommendation model 530) that is trained on a set of training data by, for example, a supervised, unsupervised, and/or reinforcement learning model, and wherein the processing circuitry may process a feature vector to provide output based upon the training. Such artificial neural networks may utilize a variety of artificial neural network organizational and processing models, such as convolutional neural networks (CNN), recurrent neural networks (RNN) optionally including long short-term memory (LSTM) units and/or gated recurrent units (GRU), stacking-based deep neural networks (S-DNN), state-space dynamic neural networks (S-SDNN), deconvolution networks, deep belief networks (DBN), and/or restricted Boltzmann machines (RBM). Alternatively or additionally, the processing circuitry may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

Although embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with embodiments herein, various modifications and changes can be made without departing from the scope of the present disclosure, which may be understood by those skilled in the art to which the present disclosure pertains. In addition, such modifications and changes should be considered within the scope of the claims appended herein.

The invention claimed is:

1. A method for assisting video content viewing, the method being performed by processing circuitry of a user terminal, and the method comprising:
   displaying a playback screen of first video content on a display of the user terminal, the first video content being played on the playback screen;
   generating a graphic object configured to enable playback of similar content associated with a first playback time of the first video content; and
   displaying the graphic object on the display together with the playback screen of the first video content, wherein the method further includes
   extracting a keyword based on information associated with the first video content,
   determining at least one comparison criterion based on the keyword, and
   determining the similar content based on the at least one comparison criterion,
   the first playback time in the first video content has a similarity to preference information, the similarity being equal to or greater than a first threshold,
   the preference information includes at least one of a preferred image feature, a preferred sound feature, or a preferred text feature, and
   the method further includes determining the preference information based on a plurality of playback times in a plurality of first videos at which a respective positive feedback input is received, each of the plurality of playback times being associated with a respective first image feature, a respective first sound feature, and a respective first text feature.

2. The method according to claim 1, wherein the information associated with the first video content includes at least one of a title of the first video content, a description of the first video content, or a hashtag corresponding to the first video content.

3. The method according to claim 1, wherein the similar content is a second playback time in the first video content or a third playback time in a second video content.

4. The method according to claim 1, wherein the at least one comparison criterion includes at least one of a second image feature, a second sound feature, or a second text feature.

5. The method according to claim 1, wherein the determining the at least one comparison criterion comprises determining the at least one comparison criterion to include a second image feature and a second text feature in response to determining that the keyword is associated with a visual theme.

6. The method according to claim 1, wherein the determining the at least one comparison criterion comprises determining the at least one comparison criterion to include a second sound feature and a second text feature in response to determining that the keyword is associated with an auditory theme.

7. The method according to claim 1, wherein the displaying the graphic object comprises displaying the graphic object in response to receiving a positive feedback input, the first playback time in the first video content being associated with a point at which the positive feedback input is received.

8. The method according to claim 1, further comprising:
   displaying a chatbot message on the display together with the playback screen of the first video content while playing the first video content, the chatbot message being associated with a second playback time in the first video content.

9. The method according to claim 8, further comprising:
   generating the chatbot message using a chatbot model, the chatbot model being trained based on
   a plurality of comments in a second plurality of videos, and
   at least one of a respective third image feature, a respective third sound feature, or a respective third text feature associated with each of the plurality of comments.

10. The method according to claim 9, wherein the chatbot model is trained by applying a weight based on a respective number of positive feedback inputs associated with each of the plurality of comments.

11. The method according to claim 9, further comprising:
determining the chatbot message based on at least one of a fourth image feature, a fourth sound feature, or a fourth text feature of the second playback time in the first video content.

12. The method according to claim 9, wherein
the second playback time in the first video content is associated with a point at which an utterance is input into a chat window; and
the method further comprises determining the chatbot message based on at least one of
a fourth image feature, a fourth sound feature, or a fourth text feature of the second playback time in the first video content, and
the utterance.

13. The method according to claim 1, further comprising:
displaying a popular comment on the display together with the playback screen of the first video content while playing the first video content, the popular comment being associated with a third playback time in the first video content.

14. The method according to claim 13, wherein the popular comment is a comment that received a highest amount of positive feedback among a plurality of comments that include a timestamp of the third playback time.

15. The method according to claim 13, wherein the popular comment has a number of inputs indicating positive feedback equal to or greater than a second threshold.

16. A non-transitory computer-readable recording medium storing instructions that, when executed by one or more processors, cause the one or more processors to perform the method according to claim 1.

17. A user terminal, comprising:
a display;
communication unit; and
processing circuitry configured to
display a playback screen of first video content on the display, the first video content being played on the playback screen;
generate a graphic object configured to enable playback of similar content associated with a first playback time of the first video content; and
displaying the graphic object on the display together with the playback screen of the first video content, wherein
the processing circuitry is configured to
extract a keyword based on information associated with the first video content,
determine at least one comparison criterion based on the keyword, and
determine the similar content based on the at least one comparison criterion,
the first playback time in the first video content has a similarity to preference information, the similarity being equal to or greater than a first threshold,
the preference information includes at least one of a preferred image feature, a preferred sound feature, or a preferred text feature, and
the processing circuitry is configured to determine the preference information based on a plurality of playback times in a plurality of videos at which a respective positive feedback input is received, each of the plurality of playback times being associated with a respective image feature, a respective sound feature, and a respective text feature.

* * * * *